Figure 1:
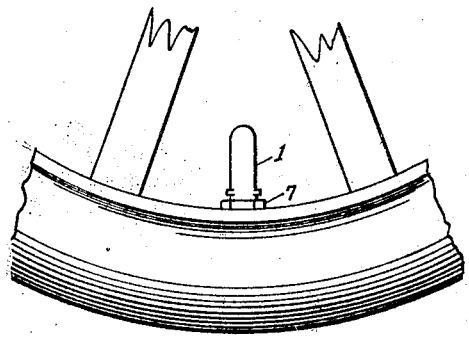

April 1, 1924.  J. A. BOWDEN  1,488,906

SPRING INSERT FOR DUST CAPS

Original Filed March 9, 1920

INVENTOR

Junius A. Bowden

Patented Apr. 1, 1924.

1,488,906

UNITED STATES PATENT OFFICE.

JUNIUS A. BOWDEN, OF LOS ANGELES, CALIFORNIA, ASSIGNOR TO A. SCHRADER'S SON, INCORPORATED, OF BROOKLYN, NEW YORK, A CORPORATION OF NEW YORK.

SPRING INSERT FOR DUST CAPS.

Application filed March 9, 1920, Serial No. 364,430. Renewed August 16, 1922. Serial No. 582,643.

*To all whom it may concern:*

Be it known that I, JUNIUS A. BOWDEN, a citizen of the United States, residing at Los Angeles, in the county of Los Angeles, State of California, have invented a new and useful Improvement in Spring Inserts for Dust Caps, of which the following is a specification.

This invention relates to a specially shaped spring intended for use in combination with a tire valve stem, the spring being designed for inserting in a dust cap adapted for it, as means of holding the cap upon the tire valve stem for protecting the stem.

One object of the invention is to provide a substantially elliptical spring that will have means adapted for engaging a recess in a dust cap provided for the reception of the spring, and be held in the recess while serving its purpose in holding the cap upon a tire valve stem and not removable except by intentional force.

Another object of the invention is to provide a substantially elliptical spring, carried in a dust cap said spring being somewhat contracted along its major axis for the purpose of causing a spring tension against a valve stem. It will be noted that preference is given to applying the contracted portion of the spring to the longitudinal flat surfaces of the valve stem, as shown in the drawings, yet the broad idea of the invention is to cover the application of such spring that may co-engage the tire stem over its threaded portion if desired.

Another object of the invention is to provide a spring of such shape that it will not interfere with the air tip closure commonly used on valve stems, when pressing the cap with the spring inserted, upon the valve stem.

A further object is to provide a dust cap with an inner curved recess adapted for receiving and holding the spring securely therein by the tension of the spring.

A further object is to provide a simple and inexpensive device for the purpose intended. With these and other objects in view the advantages of my improvement will be brought out more fully and clearly in the following specifications and accompanying drawings.

Figure 4:
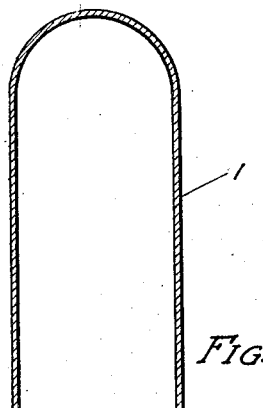
Figure 2:
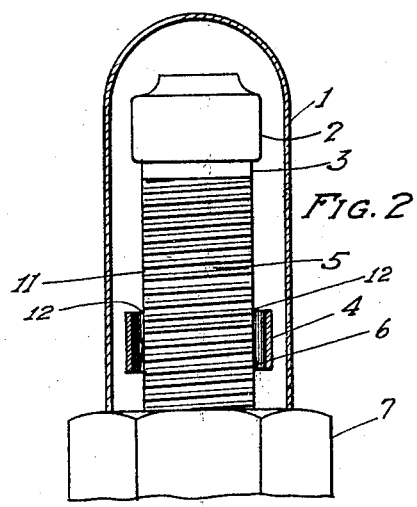
Figure 3:
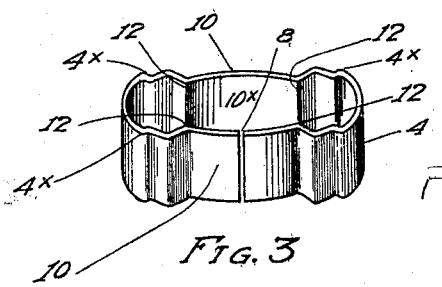
Figure 5:
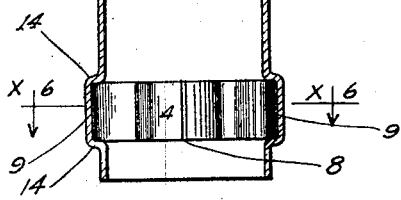
Figure 6:
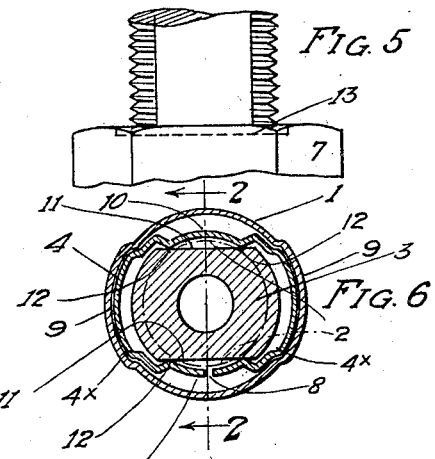

Fig. 1 shows my cap installed on the tire valve. Fig. 2 is a sectional view of my cap 1 and substantially elliptical spring 4 mounted upon a tire valve 3, looking in the direction of arrows 2—2 of Fig. 6. Fig. 3 shows an enlarged perspective view of my spring. Fig. 4 is another view of the cap in section and spring secured in the cap. Fig. 5 shows the tire valve stem 3, air tip closure 2 and rim nut 7. Fig. 6 shows a cross section or plan view of my cap 1, spring 4 and the tire valve stem 3, through $X^6$—$X^6$ of Fig. 4.

Referring in detail to the different drawings. Fig. 2 shows the position of spring 4, secured in the cap and with the spring mounted upon the stem 3, as indicated by a cross section in Fig. 6. It will be noted the lower portion of the spring 4 is flared at 6, the object being to make it easy and convenient for entering upon and over the tip 2 and upon the flat surfaces 11 of the valve stem 3.

Fig. 3 brings out a clear understanding of the shape of the spring, which is somewhat in the form of an ellipse and having many angles. These angles have several functional features which adapt themselves in a manner to produce the novel result of the invention. This spring as shown is to be formed out of thin sheet metal, which may already be spring tempered, such as hard brass or bronze, or the spring may be formed out of suitable steel and tempered afterwards to give the required spring action. The shaped spring being longer than it is wide is formed at each end with a slight extension between shoulders $4^x$ and $4^x$, this extension is somewhat circular in formation as shown, it being made to fit and conform to the recess 9 of the cap 1, as shown in Fig. 4. The spring has four inwardly formed V-shaped portions or humps 12, and the spring swells out at 10, forming a slightly enlarged central opening $10^x$, causing a somewhat greater width than the distance across from one V-shaped hump 12, to the other hump 12 on opposite side. The object of this enlarged opening is quite necessary and therefore one important part of my invention, as it provides a clearance between the tip 2 (see tip 2 indicated by dotted line and widened portion 10 of Fig. 6) which indicates the relative position of the parts, and shows a clearance that permits of the spring, when installed in the cap, (as of Fig. 4) to pass freely over the tip and the V points 12 engage the flats 11 of the stem. It must be remembered that tip 2 is an air closure for the end of the valve stem and remains thereon when cap 1 is pressed upon the stem for housing it, so without the central expanded opening 10ˣ of the spring, if an attempt was made to mount the cap with the spring installed, the spring would strike the tip. The spring could be forced by expansion over the tip if made flaring enough, yet this would be an objectional operation. However, this would come within the broad spirit of my invention.

Figs. 4, 5 and 6 may be explained jointly and progressively. Fig. 4 clearly shows the cap 1 in section with its side recesses 9, and the spring 4 secured therein by means of its extension end portions at 4ˣ, thus forming a complete unit ready for mounting upon and enclosing the valve stem 3 of Fig. 5. The operation in the use of my device, is simply pressing the cap in a straight line over the stem, if when facing the cap the location of the side recesses are indicated directly at each side, in this way the spring is guided upon the flat surfaces 11 and the humps 12 of the spring bear firmly against the flat surfaces of the stem 3 as shown in Fig. 6, and the cap is pushed forward over the stem until it seats itself in recess 13 of the nut 7. The cap will remain in that position until it is pulled off.

Referring particularly to Fig. 6, which shows a cross-section through $X^6-X^6$ of Fig. 4, it will be noted the spring is so formed as to have several important functional and novel features. However, some variation could be made in its form that would serve substantially the same purpose and come within the scope of my invention. The main object being to have a substantially elliptical spring having extension ends adaptable for engaging a suitable recess within a dust cap, and the spring being made somewhat narrower centrally so as to cause a spring tension against the valve stem, for the purpose of holding it thereon. The spring as shown is split at 8, and by contracting it and inserting it in its contracted position in the cap, until the extension end portions of the spring register within the recess 9, then when released it expands and snaps into place and remains in a definite position on account of the shoulders 14 of the cap but may be forcibly removed if desired.

I do not limit myself to a split spring or the use of thin sheet metal. I do not limit myself to a cap having separate recesses on opposite sides but prefer this form as it furnishes guide means and prevents rotation of the cap on the spring. A particular advantage is obtained when having a recess on each side in the cap and of a definite length as it furnishes a visible indication of the exact position of the spring so that it may be placed in direct position for sliding over the stem in order that the narrow portion of the spring will engage the flat surfaces of the stem when installing the cap, thus it may be said that the inner recesses of the cap cause an expansion of the metal, as shown upon the surface of the cap and which act as visible guide means for installing the cap.

Having thus described my invention, what I claim is:

1. Means for holding a dust cap upon a tire valve stem, comprising a substantially elliptical spring formed with contracted portions adapted to engage said stem and to be held thereto by the tension of the spring, parts of said spring remote from the contracted portions being secured within the dust cap.

2. Means for holding a dust cap upon a tire valve stem, comprising a substantially elliptical spring, the sides flanking the major axis of the spring having inwardly projecting humps adapted to engage said stem and be held thereto by the tension of the spring, and the sides flanking the minor axis being secured within the dust cap.

3. In combination with a tire valve stem having longitudinal flat surfaces and an air tip closure on the outer end of said stem, the thickness of the stem between the flat surfaces being less than the diameter of said tip closure, of an elongated substantially elliptical spring fitted in a dust cap, said spring having a portion adapted to slidably engage the flat surfaces of the stem and a portion adapted to clear said tip closure when mounting the ring and cap on the stem.

4. In combination with a tire valve stem having two longitudinal flat surfaces, one opposite to the other and the same provided at its outer end with an air tip closure, a cap adapted for enclosing said stem, said cap formed with an inner recess on one side and a recess on the opposite side, an elongated substantially elliptical split spring having a portion at each end adapted to fit into said recesses and to be held therein by the tension of the spring, said spring being adapted to pass over said tip and having inwardly projecting humps on its opposite sides flanking its major axis adapted to slidably grip said flat surfaces for holding the cap detachably connected to the stem.

5. A quick detachable dust cap for a tire valve stem or the like, comprising a cap portion having diametrically opposite recesses, an elongated substantially elliptical spring having extension portions adapted to fit within said recesses and to be held securely therein, the sides flanking the major axis of said spring having inwardly projecting humps adapted to engage and bear firmly against said valve stem.

6. A quick detachable dust cap for a tire valve stem having longitudinal flat surfaces and an air tip closure on its outer end of smaller diameter than the stem but overlying the flat surfaces thereon, comprising a cap portion and a substantially elliptical spring therein, said spring being adapted to pass over said tip and the sides of the spring flanking its major axis having inwardly projecting portions adapted to slidably grip said flat surfaces.

In testimony whereof, I have hereunto set my hand, at Los Angeles, California, this 3rd day of March, 1920.

JUNIUS A. BOWDEN.